United States Patent
Fallside et al.

(10) Patent No.: US 7,080,029 B1
(45) Date of Patent: Jul. 18, 2006

(54) APPARATUS AND METHOD FOR OPTIMIZING GROUP BULK PURCHASES

(75) Inventors: David C. Fallside, Grass Valley, CA (US); John B. Ibbotson, Salisbury (GB); Andrew J. Stanford-Clark, Chale (GB)

(73) Assignee: International Business Machines Corp., Armonk, NY (US)

( * ) Notice: Subject to any disclaimer, the term of this patent is extended or adjusted under 35 U.S.C. 154(b) by 1203 days.

(21) Appl. No.: 09/583,479

(22) Filed: May 31, 2000

(51) Int. Cl.
*G06F 17/60* (2006.01)

(52) U.S. Cl. .................................... 705/26; 705/37
(58) Field of Classification Search ............ 705/26, 705/37
See application file for complete search history.

(56) References Cited

U.S. PATENT DOCUMENTS

| | | | |
|---|---|---|---|
| 6,260,024 B1 * | 7/2001 | Shkedy ................. | 705/37 |
| 6,269,343 B1 * | 7/2001 | Pallakoff .............. | 705/26 |
| 6,272,473 B1 * | 8/2001 | Sandholm ............. | 705/37 |
| 6,418,415 B1 * | 7/2002 | Walker et al. ........ | 705/26 |

FOREIGN PATENT DOCUMENTS

| | | | |
|---|---|---|---|
| EP | 920191 | * | 11/1998 |
| WO | WO0011570 | | 3/2000 |
| WO | WO0045318 | | 8/2000 |
| WO | WO0046727 | | 8/2000 |
| WO | WO0177958 | | 10/2001 |

OTHER PUBLICATIONS

"B2B marketplace still seeks formula for on-line surplus sales", Anonymous, Retailing Today v39n10 pp. 15-16 May 22, 2000.*

US 6,047,266, 04/2000, Van Horn et al. (withdrawn)

* cited by examiner

*Primary Examiner*—Michael Cuff
(74) *Attorney, Agent, or Firm*—Mark D. Simpson; Jerry W. Herndon

(57) ABSTRACT

Disclosed are a method, system and computer program product for placing a group order, mediated by a system having one or more computers, the method comprising the steps of: publishing, by a publisher, information about a quantity of a material; subscribing, via a subscriber, to a topic comprising said information; receiving, via a subscriber, said information; aggregating, via a subscriber, said information from at least one of said publishers; and responsive to said step of aggregating, selecting based on at least one criterion a best time to place said group order.

13 Claims, 3 Drawing Sheets

APPARATUS AND METHOD FOR OPTIMIZING GROUP BULK PURCHASES

FIELD OF THE INVENTION

The present invention relates to electronic purchasing of goods and services by purchasers, and more particularly to the purchase of bulk goods or of services depending on a bulk material by groups of purchasers.

BACKGROUND OF THE INVENTION

Group purchasing of products has been carried on for many years, usually in order to take advantage of bulk discounts offered by suppliers. Some time ago, the use of electronic methods for doing business was introduced, and various systems have been developed for the use of electronic data interchange (EDI) to exchange commercial information between, for example, purchasing organizations and suppliers. In most cases, those involved in EDI were interested in business-to-business transactions. In recent years, the growth of the Internet, and its popularization, has led to the extension of such methods to ordinary consumers. It is now possible to use the Internet to purchase books, travel tickets, hotel reservations, and many other goods.

Among the advances seen in recent times is the development of cooperative purchasing on the Internet, by means of which groups of potential customers can place their requirements and bids on the Internet, so that a central organization can carry out purchases on their behalf, again in order to gain the advantage of bulk discounts from suppliers.

U.S. Pat. No. 6,047,266, to van Horn et al., discloses the use of demand aggregation through online buying groups. Such a group is formed for the purpose of buying a particular product by defining various parameters, such as a time window in which the purchase is to be made, the starting price, and the critical mass of purchase offers that is required. Buyers are offered information enabling them to make binding offers for the product, and the system then applies programmed rules to determine whether a purchase can be made at a particular time, and at some point, the cooperative purchase reaches closure. Inventory is then allocated to satisfy the demand.

The problem faced by creators of such systems is typically one of satisfying demand for countable units of products: tickets, cameras, cars, and so on at the best price the customers will bear. When the cooperative purchase process closes a deal, the customers receive their allocated units from the inventory of the supplier. The discount gained is typically based on the number of units included in the deal; the more units ordered in one deal, the lower the price (down to some base price that represents the lowest price at which the supplier is willing to sell).

Typically also, the items purchased using such a system are one-off purchases, such as travel tickets, cars, electronic goods, and so on. The solutions provided in the art fit this model extremely well, but are not easy to adapt to a different model of commerce, such as a repeating bulk product replenishment or bulk material removal service market.

To solve the problems posed by such a market requires a wholly different commercial paradigm and technical approach.

SUMMARY OF THE INVENTION

Accordingly, in a first aspect, the present invention provides a method for placing a group order, mediated by a system having one or more computers, the method comprising the steps of: publishing, by a publisher, information about a quantity of a material; subscribing, via a subscriber, to a topic comprising said information; receiving, via a subscriber, said information; aggregating, via a subscriber, said information from at least one of said publishers; and responsive to said step of aggregating, selecting based on at least one criterion a best time to place said group order. Preferably, said criterion comprises at least one of a time criterion, a price criterion, a quantity criterion and an urgency criterion.

Said order may be an order for a bulk good.

Said information may comprise information about a remaining quantity of a material.

Said order may comprise an order in partial satisfaction of said criterion in said information of said at least one publisher.

At least one of said publishers may comprise an automatic monitoring system.

In a second aspect, the present invention provides a computer program product tangibly stored on a computer readable medium and comprising computer program instructions to, when loaded into a computer and executed thereon, perform the steps of the method of the first aspect.

In a third aspect, the present invention provides a computer system for placing a group order, the computer system comprising: means for publishing, by a publisher, information about a quantity of a material; means for subscribing, via a subscriber, to a topic comprising said information; means for receiving, via a subscriber, said information; means for aggregating, via a subscriber, said information from at least one of said publishers; and means for selecting based on at least one criterion, a best time to place said group order.

The preferred features of the second aspect comprise means for performing the preferred steps of the first aspect.

BRIEF DESCRIPTION OF THE DRAWINGS

A preferred embodiment of the invention will now be described by way of example, with reference to the accompanying drawings, in which.

DETAILED DESCRIPTION OF THE INVENTION

Figure 1:
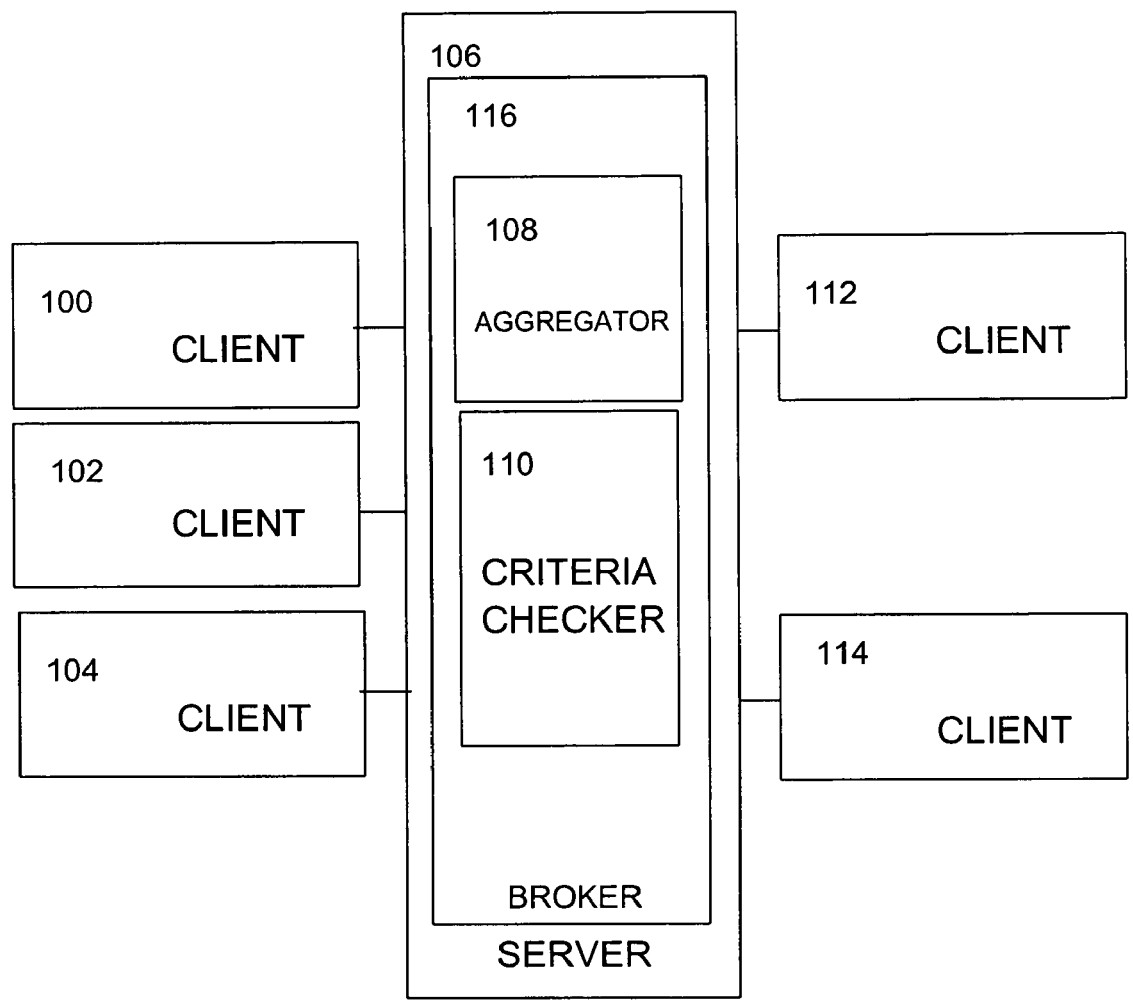
FIG. 1 shows a publish/subscribe computer system suitable to be used in a preferred embodiment of the present invention.

In FIG. 1, clients (100, 102, 104, 112, 114) are connected to a server (106) via a communications network, such as the Internet. A client, for example, client 100 acts as a publisher in the network. The technology known as publish and subscribe (or pub/sub) technology is well known in the art as a means by which user programs may publish information the content of which is matched with the interests of subscribers and forwarded to the subscribers.

In the present instance, client (100) publishes information about the status of its stock of some good, such as, for example domestic heating oil. As one skilled in the art will readily perceive, the same model may be applied to other user communities and other goods that fall within the same commercial model: a model of repeated reordering of consumables to replenish stocks at plural localities or to repeat an order for a service connected with a bulk material at plural localities. Examples are:

1. Collaborative bulk supermarket orders by individual customers, using, for example, a Web-based ordering system.

2. Bulk purchases of business consumables, such as raw materials or office supplies, by businesses in a local geographical area, such as a business or industrial park.

3. Purchases of agricultural input materials or products, such as agricultural chemicals or foodstuffs, such purchases being, for example, triggered by aggregation of information from remote sensors in storage silos.

4. Purchase of services, such as bulk waste removal or effluent tank emptying, based on monitoring of waste levels in a tank or the like.

In one embodiment of the invention, the information may be created automatically as a result of a sensor attached to a storage container for the good. Alternatively, users may manually enter such information.

Broker (116) at server (106) receives the published information.

Subscribers at clients (112, 114) have registered with the broker (116) an interest in the topic of the published information. A subscriber might, for example, be a heating oil retailer wishing to make savings by optimizing its delivery routes to customers in particular geographical areas, or with whom a set of customers have registered as a purchasing group in order to obtain a group discount. In either case, the advantages of embodiments of the present invention are clear.

In particular, it is advantageous for a community of customers, for example, living in a reasonably small geographical area, and all of whom use some commodity such as heating oil, to be able to act together in purchasing the commodity. For example, they may receive a preferential price from a supplier due to reduced delivery costs, or the supplier may pass on some savings from a volume purchase discount it has received as a result of being able to make firm orders for large quantities of the good.

The means by which clients can subscribe in a publish and subscribe system are well known to those skilled in the art.

Figure 3:
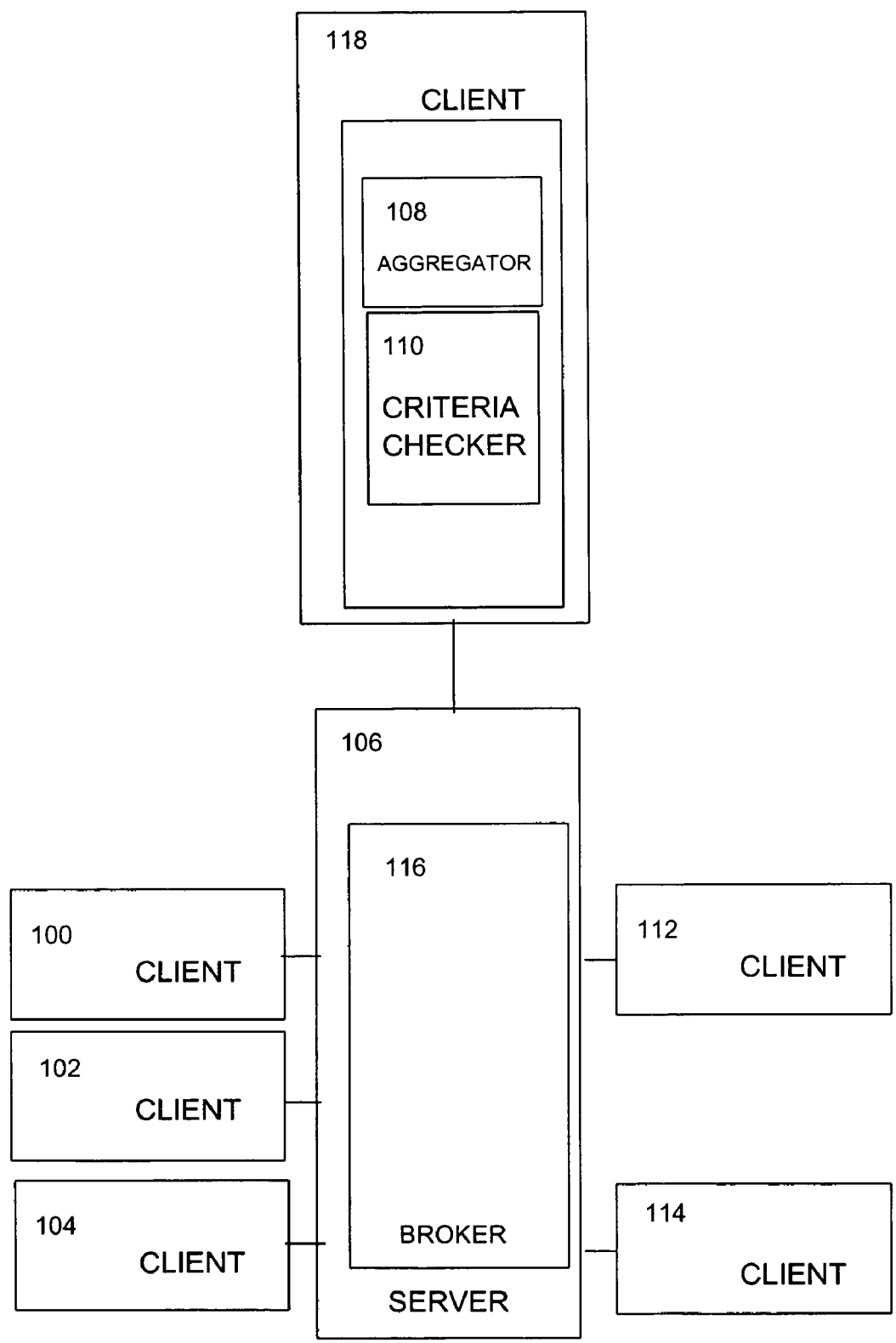
FIG. 3 shows a publish/subscribe computer system suitable to be used in an alternative embodiment of the present invention.

In one embodiment of the present invention, broker (116) is provided with an aggregator component (108) adapted to aggregate information received from publishers. This may take the form of a component within the broker (116), or alternatively, it may be a component of a server, such as the server on which the broker resides. Aggregator (108) thus aggregates the information received from the publishers and passes the aggregated information on to criteria checker (110). Criteria checker (110) may form a part of the broker, or it may be a component of a server, such as the server on which the broker resides. Both the aggregator (108) and the criteria checker (110) may also reside on a separate computer system from the server on which the broker resides, but be connectable to that server to subscribe to and receive the information provided by the publishers. One such alternative embodiment is as shown in FIG. 3, in which the numbered features are as in FIG. 1, except that client (118) has the aggregator (108) and criteria checker (110), and subscribes to the published information from publisher clients (100, 102, 104). Client (118) may then act directly to fulfil an order, or may in turn publish the order information via the publish and subscribe system, to permit the order to be filled by another subscriber, for example, at clients (112, 114).

Criteria checker (110) has a predetermined set of one or more criteria by which to determine an optimal time to close a group order. Such criteria may comprise time criteria, price criteria, quantity criteria and urgency criteria, but other criteria also may be provided to the criteria checker. The criteria checker (110) uses the criteria, in a predetermined combination which may involve any of the known methods for combining and weighting criteria for determining an optimal timing for placing an order for the good or service. The placing of the order is also carried out using the publish and subscribe system. Thus the order is placed by publishing the information, and subscribers are then free to respond by accepting the order. The criteria checker (110) may further act as an agent to participate in any of the available trading methods, such as online auctions, reverse auctions and the like, in its activity of placing an order.

Figure 2:
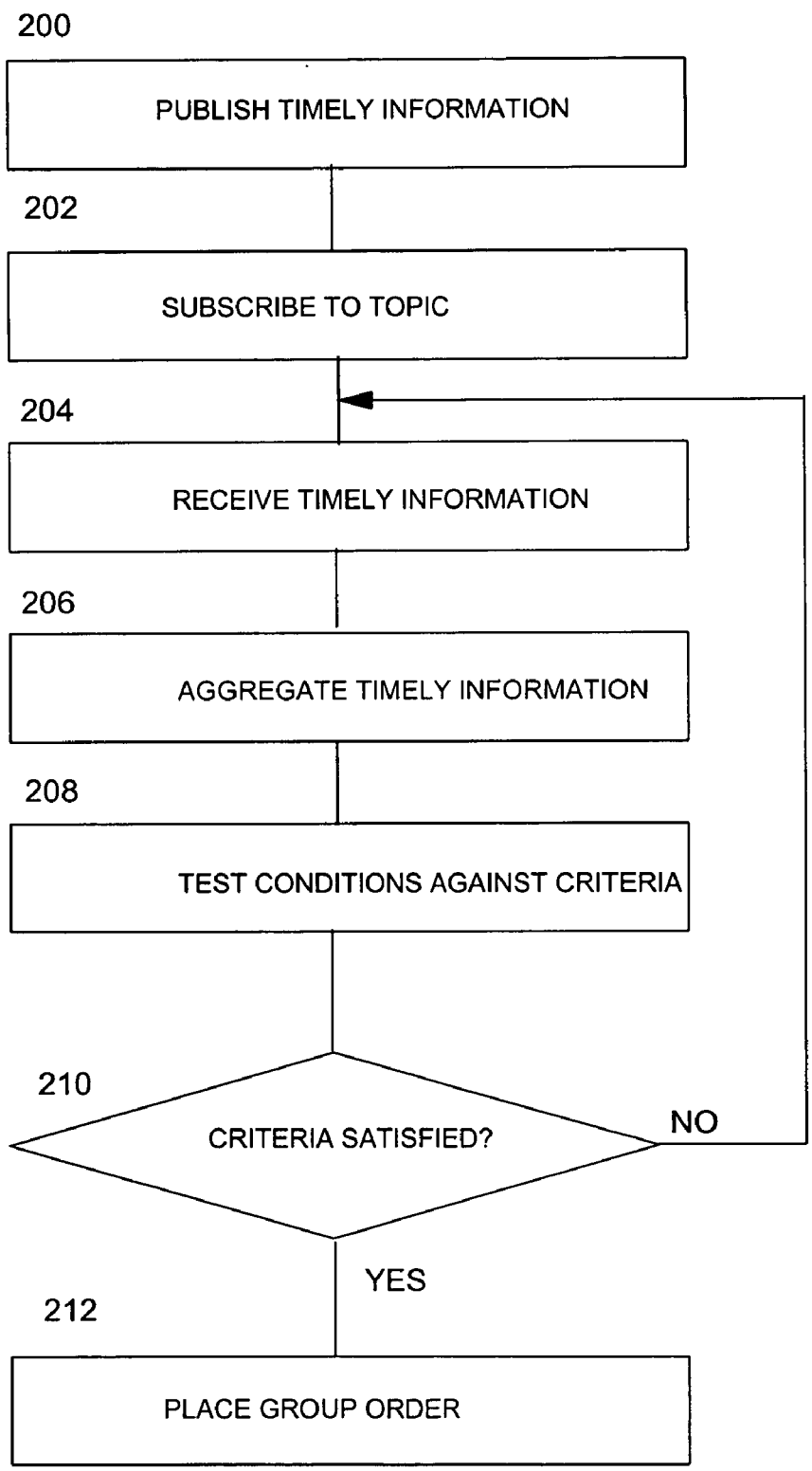
FIG. 2 shows the steps of a method according to the preferred embodiment of the present invention.

Turning to FIG. 2, a method according to a preferred embodiment of the present invention is shown. In step (200) a publisher publishes timely information relating to a need for a good or service. In step (202) a subscriber subscribes to a topic relating to information of the type published by publishers at step (200). It should be noted that these steps are not necessarily sequenced as shown in FIG. 2, and that multiple instances of each of these steps may occur in a method according to the preferred embodiment of the present invention. In any case, a subscriber (or, alternatively, an intermediate application at a broker) at step (204) receives the timely information. The subscriber (or intermediate application) at step (206) aggregates the information into a usable form for criteria checking, and at step (208) tests the present conditions shown by the aggregated information against the preset criteria. If the criteria are satisfied (step 210), an order is placed (step 212) for the good or service.

The present invention is preferably embodied as a computer program product for use with a computer system. Such an implementation may comprise a series of computer readable instructions either fixed on a tangible medium, such as a computer readable medium, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

What is claimed is:

1. A method for placing a group order, mediated by a system having one or more computers, the method comprising the steps of:
    publishing, by a publisher, information about a quantity of a material;
    subscribing, via a subscriber, to a topic comprising said information;
    receiving, via a subscriber, said information;
    aggregating, via a subscriber, said information from at least one of said publishers; and
    responsive to said step of aggregating, selecting based on at least one criterion a best time to place said group order.

2. A method as claimed in claim 1, wherein said criterion comprises at least one of a time criterion, a price criterion, a quantity criterion and an urgency criterion.

3. A method as claimed in claim 1, wherein said order is an order for a bulk good.

4. A method as claimed in claim 1, wherein said information comprises information about a remaining quantity of a material.

5. A method as claimed in claim 1, wherein said order comprises an order in partial satisfaction of said criterion.

6. A method as claimed in claim 1, wherein at least one of said publishers comprises an automatic monitoring system.

7. A computer program product tangibly stored on a computer readable medium and comprising computer program instructions to, when loaded into a computer and executed thereon, perform the steps of the method as claimed in claim 1.

8. A computer system for placing a group order, the computer system comprising:
    means for publishing, by a publisher, information about a quantity of a material;
    means for subscribing, via a subscriber, to a topic comprising said information;
    means for receiving, via a subscriber, said information;
    means for aggregating, via a subscriber, said information from at least one of said publishers; and
    means for selecting based on at least one criterion, a best time to place said group order.

9. A computer system as claimed in claim 8, wherein said criterion comprises at least one of a time criterion, a price criterion, a quantity criterion and an urgency criterion.

10. A computer system as claimed in claim 8, wherein said order is an order for a bulk good.

11. A computer system as claimed in claim 8, wherein said information comprises information about a remaining quantity of a material.

12. A computer system as claimed in claim 8, wherein said group purchase comprises partial satisfaction of said criterion in said information of said at least one publisher.

13. A computer system as claimed in claim 8, wherein at least one of said publishers comprises an automatic monitoring system.

* * * * *